United States Patent [19]

Chen et al.

[11] 3,927,311

[45] Dec. 16, 1975

[54] ARITHMETIC SYSTEM FOR HALVING AND DOUBLING DECIMAL NUMBERS

[75] Inventors: Tien C. Chen, San Jose, Calif.; Irving T. Ho, Poughkeepsie, N.Y.

[73] Assignee: International Business Machines, Corporation, Armonk, N.Y.

[22] Filed: Aug. 20, 1974

[21] Appl. No.: 498,898

[52] U.S. Cl. .......... 235/159

[51] Int. Cl.[2] .......... G06F 7/52

[58] Field of Search .......... 235/159, 160

[56] References Cited

UNITED STATES PATENTS 3,251,983 5/1966 Constant et al. .......... 235/159

3,344,261 9/1967 Hornung .......... 235/160

3,735,107 5/1973 Bolt et al. .......... 235/159

*Primary Examiner*—Malcolm A. Morrison

*Assistant Examiner*—Jerry Smith

*Attorney, Agent, or Firm*—Sughrue, Rothwell, Mion, Zinn & Macpeak

[57] ABSTRACT

An arithmetic system employing logic arrays for performing decimal halving and doubling is disclosed. Equal weighted wire matrix read only memory techniques are employed in the logic arrays to conserve required computational hardware and to facilitate large-scale circuit integration (LSI). The logic arrays are addressed by an input register containing a binary coded decimal (BCD) number, and the halved or doubled output in BCD form is read out in parallel into an output register.

6 Claims, 5 Drawing Figures

ARITHMETIC SYSTEM FOR HALVING AND DOUBLING DECIMAL NUMBERS

BACKGROUND OF THE INVENTION

1. Field of the Invention

The present invention generally relates to decimal arithmetic computing systems, and more particularly, to arithmetic systems employing logic arrays for halving or doubling a binary coded decimal (BCD) number.

2. Description of the Prior Art

In binary arithmetic, halving or doubling of a binary number, i.e., division or multiplication of the binary number by 2, is most easily performed by simply shifting the binary number in the direction of the least significant bit or in the direction of the most significant bit, respectively. Alternatively, halving or doubling logical operations may conventionally be carried out by random logic or by the newer, less widely used array logic. In such operations involving decimal arithmetic as opposed to binary arithmetic, problems are encountered when a bit is shifted across a digit boundary, e.g., a shift from the units to the tens or a shift from the tens to the hundreds. More specifically, in BCD arithmetic, division and multiplication by 2 cannot be performed by simply shifting the BCD number toward the least significant bit or toward the most significant bit, respectively, since an error occurs whenever a bit is shifted across a digit boundary.

User-oriented arithmetic, such as calculators and mini computers, is dominated by decimal arithmetic, typically in BCD form. To halve or double a decimal number is an important step in decimal division or decimal multiplication. Halving or doubling a decimal number through decimal division and multiplication is, generally, slow and expensive.

SUMMARY OF THE INVENTION

It is therefore an object of the present invention to provide a decimal arithmetic system for halving or doubling a decimal number without generating errors such as would be encounted when a bit is shifted across a digit boundary.

It is another object of the invention to provide a fast and economical decimal arithmetic system for performing halving and doubling operations without resorting to decimal division and multiplication.

According to the present invention, the foregoing and other objects are attained in a BCD arithmetic system by providing unique halving and doubling logic arrays to generate in parallel each digit in the halved or doubled BCD number. The array logic employed is a form of read only memory (ROM) and is readily fabricated using large scale integrated circuit (LSI) techniques. In the case of halving a BCD number which may be temporarily stored in an input register, the halving array for any specific digit in the BCD number is connected to the input register at the stages corresponding to the three most significant bit positions of that specific digit and the least significant bit position of the next, higher order digit. The first and last digits of the integer represented by the BCD number represents special or degenerate cases. The halving array for the first digit logically performs the function of shifting the BCD bits for that digit position toward the least significant bit position, while the halving array for the last digit to the right of the decimal point reads out 0 for even numbers or 0.5 for odd numbers.

In the case of doubling a BCD number, the doubling array for any specific digit in the BCD number is connected to the input register at the stages corresponding to the four-bit positions of that specific digit, but reads out the three most significant bits of the doubled digit and the least significant bit of the next, higher order doubled digit. Again, the first and last digits of the integer represented by the BCD number are special or degenerate cases. The first digit is simply the carry from the preceding stage, while the last digit has a least significant bit which is always 0 since any integer multiplied by two is an even number.

In both the halving and doubling arrays the array logic is an X–Y matrix memory using equal weighted row and column wiring. For each digit, two bits are decoded to drive the rows and two bits are decoded to drive the columns of the matrix. The matrix is divided into four submatrices with the rows of each submatrix being identical with the rows of the other submatrices. Actuable switches are located at selected intersections of column and row wires. Sensing amplifiers are connected to the outputs of each submatrix to combine the outputs of the submatrices to generate four bits of the output BCD number.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
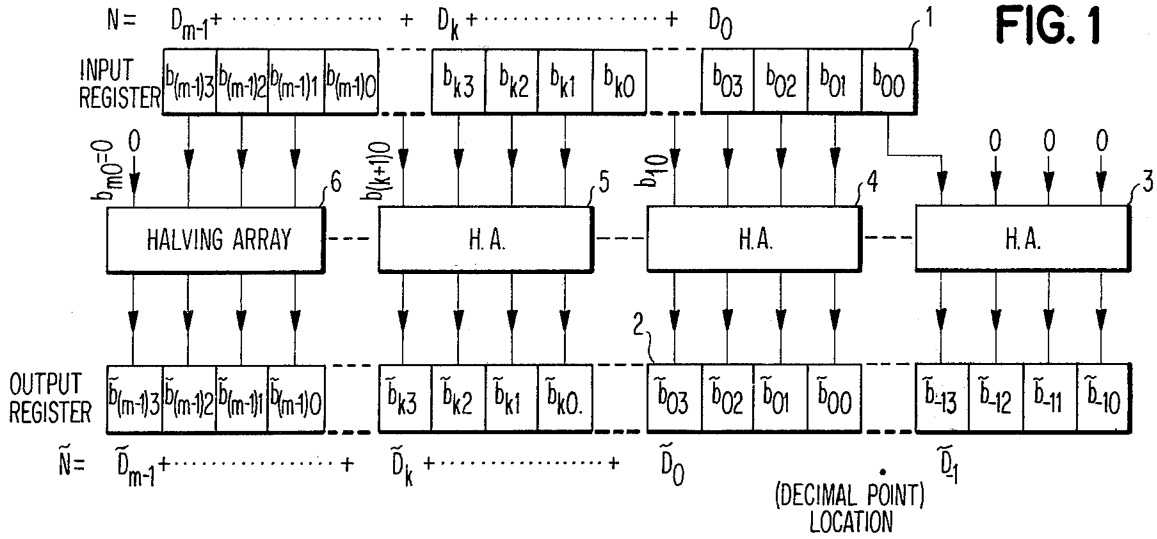
FIG. 1 is a block diagram of a BCD arithmetic halving system according to the present invention.

Considering first the case of decimal halving, an integer $N$ with $m$ digits in BCD form may be represented as follows:

$$N = \sum_{k=0}^{m-1} {}_k 10^k \tag{1}$$

where $$D_k = \sum_{j=0}^{3} b_{kj} 2^j \ . \tag{2}$$

The halving of the integer $N$ will produce no more than $(m+1)$ digits with the last digit to the right of the decimal point. Therefore, halving the integer may be represeted as follows:

$$N/2 = \tilde{N} = \sum_{k=0}^{m-1} \tilde{D}_k 10^k + \tilde{D}_{-1} 10^{-1} \ , \tag{3}$$

where $$\tilde{D}_k = \sum_{j=0}^{3} \tilde{b}_{kj} 2^j \ . \tag{4}$$

Among the $\tilde{D}_k$ (k = −1, 0, 1, . . . , m-1), $\tilde{D}_{-1}$ is generated from the last bit ($b_{00}$) of the last digit ($D_0$) of the integer $N$ as follows:

$$\tilde{D}_{-1} = \tilde{b}_{-1\,3}\,\tilde{b}_{-1\,2}\,\tilde{b}_{-1\,1}\,\tilde{b}_{-1\,0}\,. \quad (5)$$
$$\text{with } \tilde{b}_{-1\,3} \equiv \tilde{b}_{-1\,1} \equiv 0$$
$$\text{and } \tilde{b}_{-1\,2} \equiv \tilde{b}_{-1\,0} = b_{0\,0}\,.$$

What this means simply is that if the integer $N$ is even, i.e., $b_{00} = 0$, then $\tilde{D}_{-1} = 0000$. On the other hand, if the integer $N$ is odd, i.e., $b_{00} = 1$, then $\tilde{D}_{-1} = 0101$ corresponding to 0.5. $\tilde{D}_{m-1}$ is generated from $D_{m-1}$ as follows:

$$\tilde{D}_{m-1} = \tilde{b}_{(m-1)3}\,\tilde{b}_{(m-1)2}\,\tilde{b}_{(m-1)1}\,\tilde{b}_{(m-1)0}, \quad (6)$$
$$\text{with } \tilde{b}_{(m-1)3} \equiv 0,$$
$$\tilde{b}_{(m-1)2} = b_{(m-1)3},$$
$$\tilde{b}_{(m-1)1} = b_{(m-1)2},$$
$$\text{and } \tilde{b}_{(m-1)0} = b_{(m-1)1}.$$

All other $\tilde{D}_k$ can be generated from the least most significant bit in $D_{(k+1)}$ and the three most significante bits in $D_k$. Table 1 is a form of a truth table which illustrates the principles of the halving operation.

TABLE 1

HALVING

| decimal no. | | binary number | | | | | ½ decimal no. | | ½ binary number | | | |
|---|---|---|---|---|---|---|---|---|---|---|---|---|
| $10^1$ | $10^0$ | $2_{(k+1)}{}^0$ | $2^3$ | $2^2$ | $2^1$ | $2^0$ | $10^1$ | $10^0$ | $2^3$ | $2^2$ | $2^1$ | $2^0$ |
| 0 | 2 | 0 | 0 | 0 | 1 | 0 | 0 | 1 | 0 | 0 | 0 | 1 |
| 0 | 4 | 0 | 0 | 1 | 0 | 0 | 0 | 2 | 0 | 0 | 1 | 0 |
| 0 | 6 | 0 | 0 | 1 | 1 | 0 | 0 | 3 | 0 | 0 | 1 | 1 |
| 0 | 8 | 0 | 1 | 0 | 0 | 0 | 0 | 4 | 0 | 1 | 0 | 0 |
| 1 | 0 | 1 | 0 | 0 | 0 | 0 | 0 | 5 | 0 | 1 | 0 | 1 |
| 1 | 2 | 1 | 0 | 0 | 1 | 0 | 0 | 6 | 0 | 1 | 1 | 0 |
| 1 | 4 | 1 | 0 | 1 | 0 | 0 | 0 | 7 | 0 | 1 | 1 | 1 |
| 1 | 6 | 1 | 0 | 1 | 1 | 0 | 0 | 8 | 1 | 0 | 0 | 0 |
| 1 | 8 | 1 | 1 | 0 | 0 | 0 | 0 | 9 | 1 | 0 | 0 | 1 |

From Table 1 the logical equations for each $\tilde{b}_{kj}$ of $\tilde{D}_k$ can be written as follows:

$$\tilde{b}_{k0} = b_{k1}\bar{b}_{k2}\bar{b}_{k3}\bar{b}_{(k+1)0} + b_{k1}b_{k2}\bar{b}_{k3}\bar{b}_{(k+1)0} + \bar{b}_{k1}\bar{b}_{k2}\bar{b}_{k3}b_{(k+1)0} + \bar{b}_{k1}b_{k2}\bar{b}_{k3}b_{(k+1)0} + \bar{b}_{k1}\bar{b}_{k2}b_{k3}\bar{b}_{(k+1)0} \quad (7)$$

$$\tilde{b}_{k1} = \bar{b}_{k1}b_{k2}\bar{b}_{k3}\bar{b}_{(k+1)0} + b_{k1}b_{k2}\bar{b}_{k3}\bar{b}_{(k+1)0} + b_{k1}\bar{b}_{k2}\bar{b}_{k3}\bar{b}_{(k+1)0} + \bar{b}_{k1}b_{k2}\bar{b}_{k3}b_{(k+1)0} \quad (8)$$

$$\tilde{b}_{k2} = b_{k1}\bar{b}_{k2}b_{k3}\bar{b}_{(k+1)0} + \bar{b}_{k1}b_{k2}\bar{b}_{k3}\bar{b}_{(k+1)0} + \bar{b}_{k1}\bar{b}_{k2}\bar{b}_{k3}b_{(k+1)0} + b_{k1}\bar{b}_{k2}\bar{b}_{k3}b_{(k+1)0} \quad (9)$$

$$\tilde{b}_{k3} = b_{k1}b_{k2}\bar{b}_{k3}b_{(k+1)0} + \bar{b}_{k1}\bar{b}_{k2}b_{k3}b_{(k+1)0} \quad (10)$$

It should be noted that these logical equations apply as well to $\tilde{D}_{m-1}$ and $\tilde{D}_{-1}$.

Referring now to FIG. 1 of the drawing, the halving arithmetic system includes an input register 1 containing the decimal number $N$ that is to be halved. The decimal number $N$ comprised of digits $D_0$ to $D_{(m-1)}$ is represented in BCD form in register 1 which is loaded in a conventional manner. Thus, all of the bits in input register 1 are available in parallel to a plurality of halving arrays 3, 4, 5, and 6 which perform the halving operation on the decimal number $N$ and provide, in parallel, the halved decimal number $\tilde{N}$ in BCD form to output register 2. Taking halving array 5 as exemplary, it will be seen that it receives as inputs the three most significant bits of the digit $D_k$ to be halved and the least significant bit of the next, higher order digit $D_{(k+1)}$. The outputs of the halving array 5 are the four BCD bits of the halved digit $\tilde{D}_k$. The halving array 5 performs the logical operations represented by equations (7) to (10), above.

In the degenerate case of the decimal digit $\tilde{D}_{-1}$ which is either 0 or 0.5 depending on whether the decimal number $N$ is even or odd, the halving array 3 receives as its input the last bit $b_{00}$ of the last digit $D_0$ of the integer $N$. The three remaining inputs to the halving array 3 are logical zeros. Thus, halving array 3 performs the logical operation represented by equation (5). On the other hand, halving array 6 generates the digit $\tilde{D}_{(m-1)}$ from the three most significant digits of $D_{(m-1)}$ and a fourth input which is always logical zero. Thus, halving array 6 performs the logical operation represented by equation (6).

Figure 2:
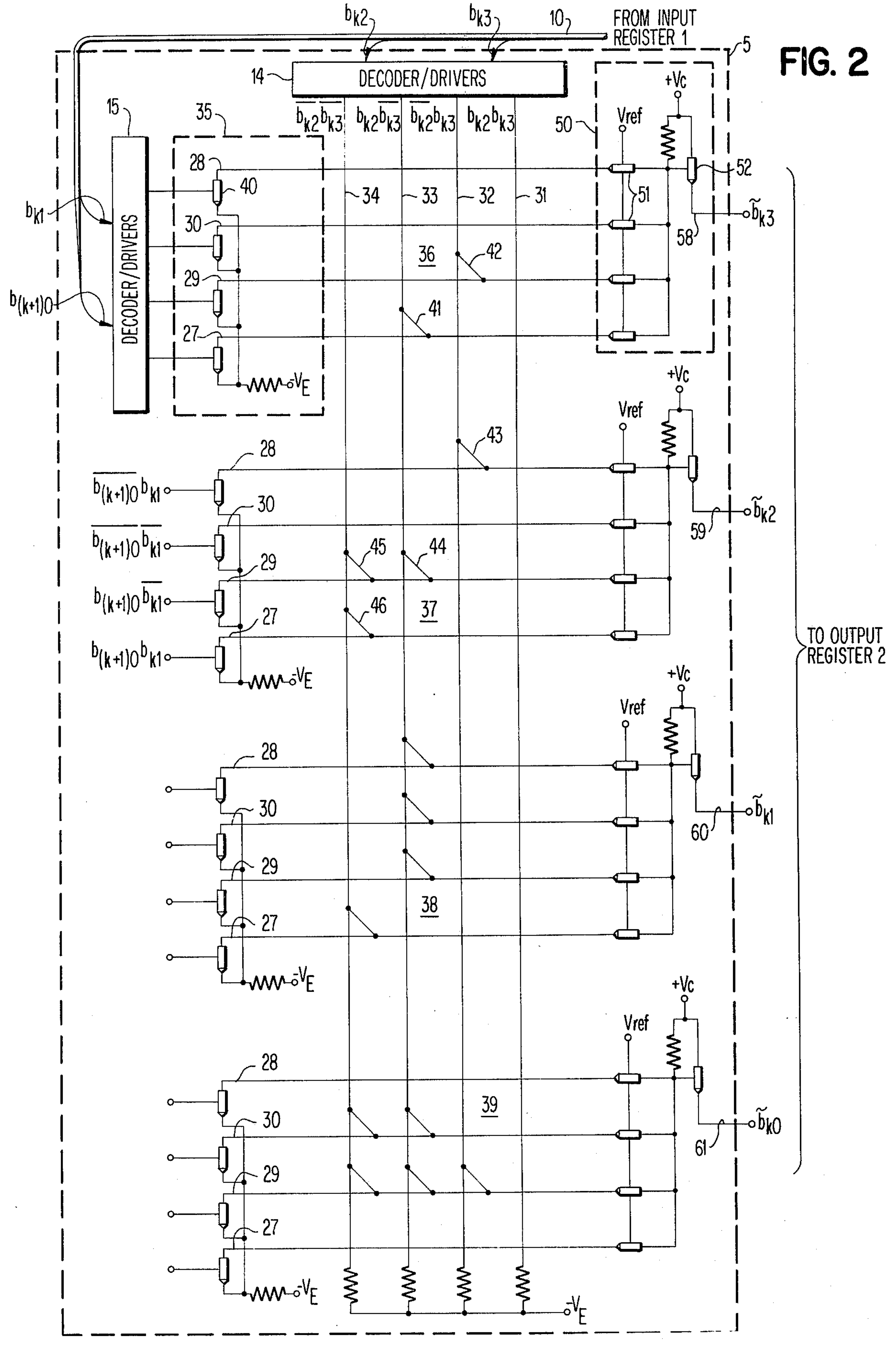
FIG. 2 is a block and schematic diagram of a halving array used in the arithmetic system shown in FIG. 1.

A typical halving array such as halving array 5 of FIG. 1 employing current switch emitter follower (CSEF) technology is shown in FIG. 2 of the drawings. The three most significant bits $b_{k3}$, $b_{k2}$, and $b_{k1}$ of the digit $D_k$ and the least significant bit $b_{(k+1)0}$ of the digit $D_{(k+1)}$ are routed via the cable 10 to the decoder/drivers 14 and 15 in the halving array 5. More specifically, the decoder/drivers 14 receives the bits $b_{k3}$ and $b_{k2}$ to provide four column outputs to the array. These column outputs are all possible combinations of these two bits and are represented by the AND functions $b_{k2}b_{k3}$, $\bar{b}_{k2}b_{k3}$, $b_{k2}\bar{b}_{k3}$, and $\bar{b}_{k2}\bar{b}_{k3}$ on column wires 31, 32, 33, and 34, respectively. Decoder/ drivers 14 receives bits $b_{k1}$ and $b_{(k+1)0}$, and provides the four sets of row outputs represented by the logical AND functions $b_{(k+1)0}b_{k1}$, $\bar{b}_{(k+1)0}b_{k1}$, $b_{(k+1)0}\bar{b}_{k1}$, and $\bar{b}_{(k+1)0}\bar{b}_{k1}$ on row wires 27, 28, 29 and 30, respectively. Each of the four sets of row wires 27 to 30 are connected to a respective buffer amplifier 35 comprising an inverter transistor amplifier 40 connected in common emitter fashion for each of the row wires 27 to 30. It will be understood that all four buffer amplifiers 35 shown in FIG. 2 are driven by the outputs from the decoder/drivers 15. The wire connections of the four buffer inputs are omitted in the drawing for the sake of clarity.

Figure 3:
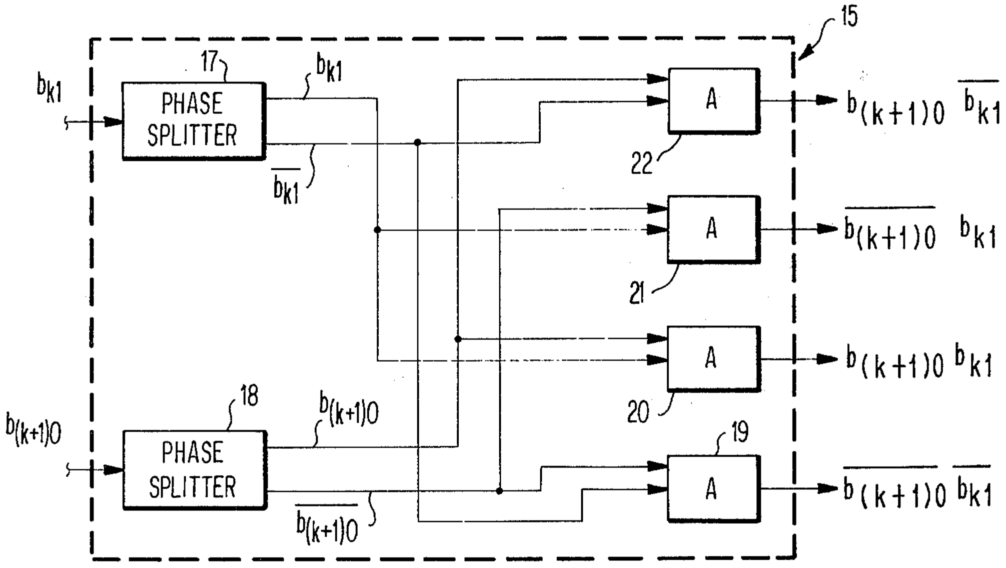
FIG. 3 is a logic diagram of a typical decoder and driver circuit used in the halving array of FIG. 2.

The decoder/drivers are shown in more detail in FIG. 3. For the sake of simplicity and clarity of exposition, FIG. 3 shows only the specific arrangement employed in decoder/drivers 15 of FIG. 2. A directly similar arrangement is employed in decoder/drivers 14 as will be apparent from the following discussion. Referring to FIG. 3, the bit $b_{k1}$ is connected to phase splitter 17 which provides a first output which is logically the same as its respective input and a second output which is the logical inverse thereof. The bit $b_{(k+1)0}$ is connected to phase splitter 18 which, like phase splitter 17, provides outputs which are logically the same and logically the inverse of its respective input. The outputs of phase splitters 17 and 18 are combined in AND gates 19, 20, 21, and 22 to produce every possible combination of the two bits $b_{k1}$ and $b_{(k+1)0}$. The outputs of AND gates 19, 20, 21, and 22 are connected to the bases of the inverter transistor amplifiers corresponding to row wires 30, 27, 28, and 29, respectively. It will thus be clear that only one of the AND gates 19, 20, 21, and 22 will produce a logical one output for any one combination of bits $b_{k1}$ and $b_{(k+1)0}$.

Referring again to FIG. 2, the column wires 31, 32, 33, and 34 constitute the Y-direction inputs to the ROM matrix. There are, however, four sets of identical row wires which constitute the X-direction inputs to four submatrices 36, 37, 38, and 39. The X-direction inputs are inverted by inverter amplifiers 40 solely to meet the conduction requirements of the transistor switches which have been selected in the preferred embodiment to establish selective connections at predetermined intersections of column and row wires in the matrix. Briefly, the base of each transistor switch is connected to one of the Y-direction or column wires 31, 32, 33, or 34, the collector thereof is connected to a source of reference potential, while the emitter is connected to one of the X-direction or row wires 27, 28, 29, or 30. Thus, an addressed transistor switch 43 is rendered conductive by the simultaneous Y and X signals of opposite levels which are applied to the base and emitter thereof. Inverter amplifiers 40 would not be required if another type of switch had been selected requiring simultaneous signals of the same direction to establish selective connections of respective matrix intersections.

The transistor switches in the ROM matrix are represented in FIG. 2 by short line segments or cross-overs such as 41 and 42 in submatrix 36. From an inspection of FIG. 2, it will be seen that the pattern of cross-overs in each submatrix is different. Submatrix 36 generates the bit $\tilde{b}_{k3}$.

Referring to equation (10), it will be seen that the cross-over connections 41 and 42 correspond to the two logical AND functions of the equation. In like manner, the cross-over connections 43 to 46 of the submatrix 37 correspond to the four logical AND functions of equation (9). Similar comparisons can be made for the cross-over connections in submatrices 38 and 39 and equations (8) and (7), respectively.

The four row outputs of each submatrix are connected to a current sense amplifier 50 which performs the logical OR function represented in each of the equations (7) to (10). The sense amplifiers 50 comprise an isolation transistor 51 for each of the row wires. The bases of these isolation transistors 51 are connected to a reference voltage, and the emitters of the transistors are connected to their respective row wires. The collectors of the isolation transistors 51 are connected in common to the base of emitter follower transistor 52. The outputs of the halving array 4 are therefore generated on output lines 58 to 61 and supplied in parallel to output register 2.

The operation of the ROM matrix is best illustrated by example. Consider the situation where the column wire 32 and the row wire 29 are simultaneously addressed. There is a cross-over connection at the intersection of these two wires in both submatrices 36 and 39. Referring to submatrix 36, this condition means that there is a logical one or high level signal on wire 32 and a logical zero or low level signal on wire 29. This combination of high and low level signals on wires 32 and 29 biases the transistor switch represented by cross-over 42 into conduction. All of the current flow will be through this transistor switch and the inverter transistor 40 connected to row wire 29 thereby preventing the corresponding isolation transistor 51 from conducting. Since none of the isolation transistors 51 are conducting, the base of emitter follower transistor 52 is high causing it to conduct and provide a high level output on line 58. The reference voltage connected to the bases of isolation transistors 51 is higher than the low level voltage which represents a logical zero but lower than the high level voltage which represents a logical one. Therefore, one of the isolation transistors 51 will conduct through its corresponding inverter transistor amplifier 40 at all times except when a transistor switch represented by one of the cross-overs is biased into conduction. Conduction of any one of the isolation transistors 51 results in a low level voltage at the base of emitter follower 52 and a corresponding low level output on line 58.

It should be noted in FIG. 2 that there is no cross-over connection made in the column line 31 connected to the output decoder/drivers 14 represented by the logical AND function $b_{k2}b_{k3}$. This is true because in BCD form the bits $b_{k3}$ and $b_{k2}$ are exclusive each to the other. Such a line will never be enabled and it can be omitted without effecting the operation of the halving array. Also exclusive in BCD are bits $b_{k3}$ and $b_{k1}$ which has been represented in FIG. 2 at cross-over 43. It will thus be recognized that the approach shown can work equally well on 0–10 or 0–11 redundant decimal notation as it does on the 0–9 standard decimal notation.

In the case of decimal doubling, the integer $N$ is again represented by the following expression:

$$N = \sum_{k=0}^{m-1} {}_k 10^k , \tag{11}$$

where $$D_k = \sum_{j=0}^{3} b_{kj} 2^j . \tag{12}$$

Then the decimal number doubled is represented as follows:

$$2N = \hat{N} = \sum_{k=0}^{m} \hat{D}_k 10^k , \tag{13}$$

where $$\hat{D}_k = \sum_{j=0}^{3} \hat{b}_{kj} 2^j \tag{14}$$

Where $\hat{D}_m$ can only be zero or 1 and $\hat{D}_0$ is the result of a simple shift of the bit pattern of $D_0$. These are again the degenerate cases and in order to develop the equations for the intermediate cases represented by the digits $\hat{D}_k$ reference is made to Table 2 below which will be recognized as a transposition of Table 1:

TABLE 2

DOUBLING

| decimal no. | | binary number | | | | 2× decimal no. | | 2× binary number | | | | |
|---|---|---|---|---|---|---|---|---|---|---|---|---|
| $10^1$ | $10^0$ | $2^3$ | $2^2$ | $2^1$ | $2^0$ | $10'$ | $10^0$ | $2_{(k+1)}$ | $2^3$ | $2^2$ | $2^1$ | $2^0$ |
| 0 | 1 | 0 | 0 | 0 | 1 | 0 | 2 | 0 | 0 | 0 | 1 | 0 |
| 0 | 2 | 0 | 0 | 1 | 0 | 0 | 4 | 0 | 0 | 1 | 0 | 0 |
| 0 | 3 | 0 | 0 | 1 | 1 | 0 | 6 | 0 | 0 | 1 | 1 | 0 |
| 0 | 4 | 0 | 1 | 0 | 0 | 0 | 8 | 0 | 1 | 0 | 0 | 0 |
| 0 | 5 | 0 | 1 | 0 | 1 | 1 | 0 | 1 | 0 | 0 | 0 | 0 |
| 0 | 6 | 0 | 1 | 1 | 0 | 1 | 2 | 1 | 0 | 0 | 1 | 0 |

TABLE 2-continued

| decimal no. | | binary number | | | | DOUBLING 2× decimal no. | | 2× binary number | | | | |
|---|---|---|---|---|---|---|---|---|---|---|---|---|
| 0 | 7 | 0 | 1 | 1 | 1 | 1 | 4 | 1 | 0 | 1 | 0 | 0 |
| 0 | 8 | 1 | 0 | 0 | 0 | 1 | 6 | 1 | 0 | 1 | 1 | 0 |
| 0 | 9 | 1 | 0 | 0 | 1 | 1 | 8 | 1 | 1 | 0 | 0 | 0 |

Using Table 2 as a truth table, the equations (15), (16), (17), and (18), for the bits $\hat{b}_{k0}$, $\hat{b}_{k1}$, $\hat{b}_{k2}$, and $\hat{b}_{k3}$, respectively, can be written as follows:

$$\hat{b}_{k0} = C_{(k-1)} \equiv \text{carry from preceding digit} \quad (15)$$

$$\hat{b}_{k1} = b_{k0}\bar{b}_{k1}\bar{b}_{k2}\bar{b}_{k3} + b_{k0}b_{k1}\bar{b}_{k2}\bar{b}_{k3} + \bar{b}_{k0}b_{k1}b_{k2}\bar{b}_{k3} + \bar{b}_{k0}\bar{b}_{k1}\bar{b}_{k2}b_{k3} \quad (16)$$

$$\hat{b}_{k2} = \bar{b}_{k0}b_{k1}\bar{b}_{k2}\bar{b}_{k3} + b_{k0}\bar{b}_{k1}b_{k2}\bar{b}_{k3} + b_{k0}b_{k1}b_{k2}\bar{b}_{k3} + \bar{b}_{k0}\bar{b}_{k1}\bar{b}_{k2}b_{k3} \quad (17)$$

$$\hat{b}_{k3} = \bar{b}_{k0}\bar{b}_{k1}b_{k2}\bar{b}_{k3}\ 30\ b_{k0}\bar{b}_{k1}\bar{b}_{k2}b_{k3} \quad (18)$$

It will be noticed in equation (15) that the least significant bit $b_{k0}$ is equal to the carry from the preceding digit $C_{(k-1)}$. Generation of the digit $\hat{D}_k$ will itself produce a carry which is the least significant bit $\hat{b}_{(k+1)0}$ of the next higher order digit $\hat{D}_{(k+1)}$. This carry $C_k$ is represented by equation (19) as follows:

$$C_k \equiv \hat{b}_{(k+1)0} = b_{k0}\bar{b}_{k1}b_{k2}\bar{b}_{k3} + \bar{b}_{k0}b_{k1}b_{k2}\bar{b}_{k3} + b_{k0}b_{k1}b_{k2}\bar{b}_{k3} + \bar{b}_{k0}\bar{b}_{k1}\bar{b}_{k2}b_{k3} + b_{k0}\bar{b}_{k1}\bar{b}_{k2}b_{k3} \quad (19)$$

Figure 4:
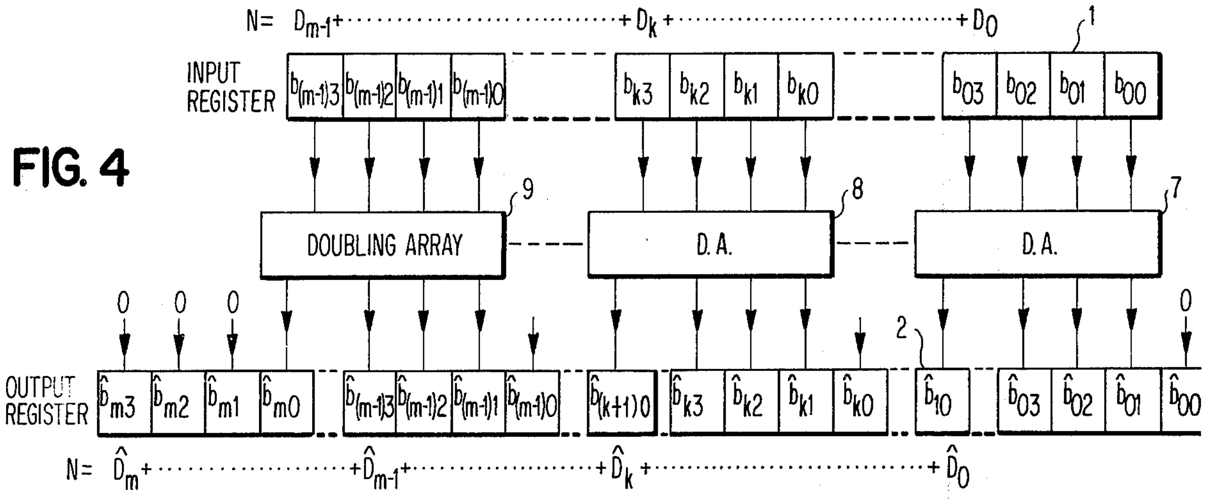
FIG. 4 is a block diagram of a BCD doubling arithmetic system according to the invention.

The doubling arithmetic system is shown in block diagram form in FIG. 4 and includes the input register 1, doubling arrays 7, 8 and 9, and output register 2. After the input register 1 is loaded in a conventional manner, the outputs from each bit position of the BCD integer $N$ are simultaneously available to the doubling arrays 7, 8 and 9. The outputs of the doubling arrays are supplied in parallel to the output register 2. It should be noted that the least significant bit $\hat{b}_{00}$ of the least significant digit $\hat{D}_0$ is always 0 since any integer doubled is an even number. On the other hand, the digit $\hat{D}_m$ may be represented by a single binary bit $\hat{b}_{m0}$ which is nothing more than the carry from the preceding stage.

Figure 5:
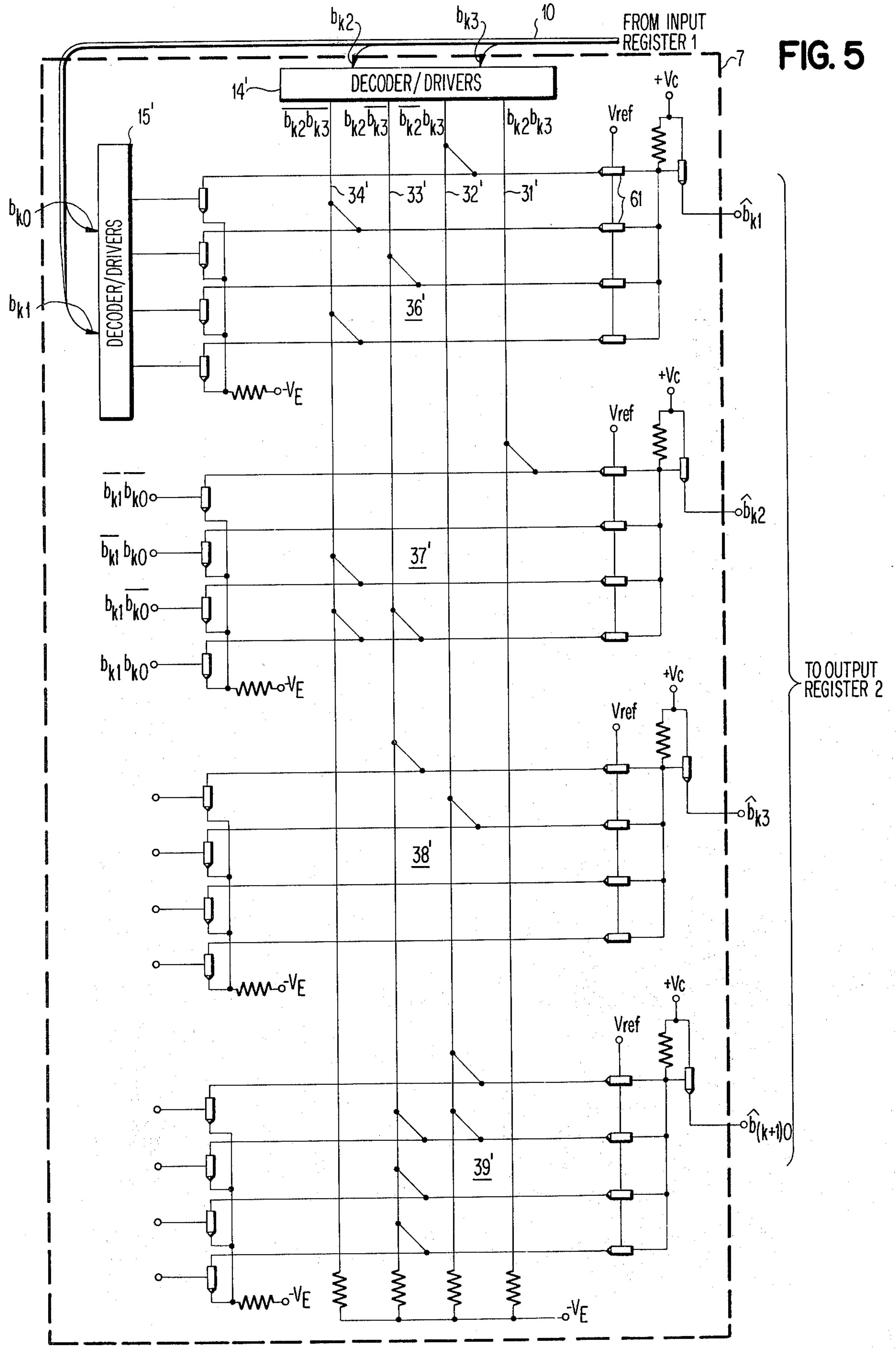
FIG. 5 is a block and schematic diagram of a doubling array used in the arithmetic system shown in FIG. 4.

A doubling array, for example, doubling array 8, is shown in FIG. 5. Similarly to the halving array shown in FIG. 2, the input register 1 is connected via cables 10' to decoders/drivers 14' and 15' of the doubling array. These decoder/drivers 14' and 15' are identical with decoder/drivers 14 and 14 of FIG. 2 in construction and operation. It will be noticed, however, that the inputs to decoder/drivers 15' are the binary bits $b_{k1}$ and $b_{k0}$. Decoder/drivers 14' provide outputs on column wires 31' to 34' while decoder/drivers 15' provide outputs on four sets of row wires 27' to 30'. These column and row wires form a matrix comprising four submatrices 36' to 39'. This arrangement is the same as shown in FIG. 2 relating to the halving array, the difference being merely the cross-over connections between column and row wires in each of the submatrices. Thus, with respect to the generation of the output bit $\hat{b}_{k1}$, the cross-over connections of the submatrix 36' correspond to the AND functions of equation (16). In like manner, submatrices 37', 38', and 39' generate the AND functions in equation (17), (18), and (19), respectively.

It is interesting to compare FIG. 1 to FIG. 4. A halving array has its inputs from two digits but its outputs go into a single digit. In a doubling array the exact opposite is the case. The most significant bit output from a doubling array is a decimal carry which constitutes the least significant bit in the next higher order digit. It should be understood, however, that this carry is not propagated.

It will be apparent that the embodiments shown are only exemplary and that various modifications can be made in construction and arrangement within the scope of the invention as defined in the appended claims.

We claim:

1. An arithmetic system for halving or doubling a decimal number, comprising:

an input register for temporarily storing said decimal number in binary coded decimal form, an output register for receiving an output decimal number in binary coded decimal form, and a plurality of logic arrays connected to receive in parallel the bits in said input register and to generate a parallel output which is connected to said output register, each of said logic arrays including first decoder/driver means receiving two bits in a sequence of four bits and providing a plurality of column outputs;

second decoder/driver means receiving the remaining two bits in said sequence four bits and providing a plurality of row outputs;

a read only memory matrix of column and row conductors connected respectively to said column outputs and to said row outputs and having actuaable switches at selected matrix intersections, each said switch being actuated by simultaneous outputs on the column and row conductors forming the intersection at which said switch is located;

sensing means connected to said read only memory matrix for combining outputs from said matrix to generate an output sequence of four bits which comprise part of said output decimal number in binary coded decimal form.

2. An arithmetic system for halving or doubling a decimal number as recited in claim 1 wherein said plurality of rows are divided into four identical sets and the intersection of each set of row conductors with said column conductors forms a submatrix in said read only memory matrix, said actuable switches at selected matrix intersections being located in different patterns in each submatrix, each submatrix providing outputs which when combined by said sensing means generate a single bit of said output decimal number in binary coded decimal form.

3. An arithmetic system for halving or doubling a decimal number as recited in claim 2 wherein said first and second decoder/driver means each comprise a plurality of AND gates for providing different logical combinations of two bits to generate said column and row outputs, respectively.

4. An arithmetic system as recited in claim 3, wherein said logic arrays are halving arrays and said first decoder/driver means receives the two most significant bits of a binary coded decimal digit to be halved, said second decoder/driver means receives the third most significant bit of said decimal digit and the least significant bit of the next, higher order decimal digit, and said sensing means generates the four bits representing a single decimal digit of said output decimal number in binary coded decimal form.

5. An arithmetic system as recited in claim 4, wherein both inputs to said first decoder/driver means and one input to said second decoder/driver means of the lowest order logic array of said plurality of logic arrays and one input to said second decoder/driver means of the highest order logic array of said plurality of logic arrays are logical zeros.

6. An arithmetic system as recited in claim 3 wherein said logic arrays are doubling arrays and said first decoder/driver means receives the two most significant bits of a binary coded decimal digit to be doubled, said second decoder/driver means receives the two least significant bits of said decimal digit to be doubled and said sensing means generates the three most significant bits representing twice said decimal digit in binary coded decimal form plus the least significant bit of the next, higher order decimal digit.

* * * * *

UNITED STATES PATENT AND TRADEMARK OFFICE

CERTIFICATE OF CORRECTION

PATENT NO. : 3,927,311

DATED : December 16, 1975

INVENTOR(S) : T.C. Chen et al

It is certified that error appears in the above-identified patent and that said Letters Patent are hereby corrected as shown below:

Column 2, line 50 - delete "$_k10^k$" and insert -- $D_k10^k$ --

Column 3, line 16 - delete "significante" and insert -- significant--
In first row of Table 1 "$2_{(k+1)}{}^{O}$" should be $-2^0{}_{(k+1)}$. -- line 38 - In first line of Eq. 9 delete "$\bar{b}_{(k+1)0}$" second Occurrence)
and insert -- $b_{(k+1)0}$ --

Column 4, line 17 - delete "drivers 14" and insert --drivers 15--

Column 6, line 36 - delete "$_k10^k$" and insert -- $D_k10^k$ --

Column 7, line 15 - In Eq. 17 delete "$+b_{k0}b_k1\bar{b}_k2\bar{b}_k3$" and insert
-- $+b_{k0}b_{k1}\bar{b}_{k2}\bar{b}_{k3}$ -- line 17 - In Eq. 18 delete "30" and insert -- + --
line 46 - delete "14" (second occurrence) and insert --15--

Column 8, line 37 - delete "actuaable" and insert -- actuable--

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*